United States Patent [19]

Stoner

[11] 3,957,093

[45] May 18, 1976

[54] LIQUID SUPPLY DEVICE WITH AUTOMATIC FLOW CUT-OFF

[76] Inventor: Joel A. Stoner, 700 N. O'Plaine Road, Gurnee, Ill. 60031

[22] Filed: Feb. 13, 1975

[21] Appl. No.: 549,686

[52] U.S. Cl. ............................... 141/209; 141/225; 141/286
[51] Int. Cl.² ........................................... B65B 3/26
[58] Field of Search .................... 141/367, 192–229, 141/285–310

[56] References Cited
UNITED STATES PATENTS

| | | | |
|---|---|---|---|
| 2,822,831 | 2/1958 | Williams | 141/209 |
| 3,221,782 | 12/1965 | Zellweger et al. | 141/286 |

*Primary Examiner*—Houston S. Bell, Jr.
*Attorney, Agent, or Firm*—Hibben, Noyes & Bicknell, Ltd.

[57] ABSTRACT

A filling device for delivering liquid to a container, such as a storage battery, with valve actuating means for automatically cutting off liquid flow when the liquid level reaches the level of the discharge nozzle and which is operated by having a vacuum formed within the discharge nozzle wherein the liquid inlet passage to the valve is restricted to substantially reduce the rate of liquid flow from a liquid supply line into the valve chamber and the discharge nozzle is provided with a narrow liquid outlet passage formed around the end of a vacuum line connected with said valve actuating means with the size of the inlet and outlet passages being coordinated so that liquid flow is cut off only when the liquid in the container being filled reaches the level of the lower end of said discharge nozzle.

2 Claims, 5 Drawing Figures

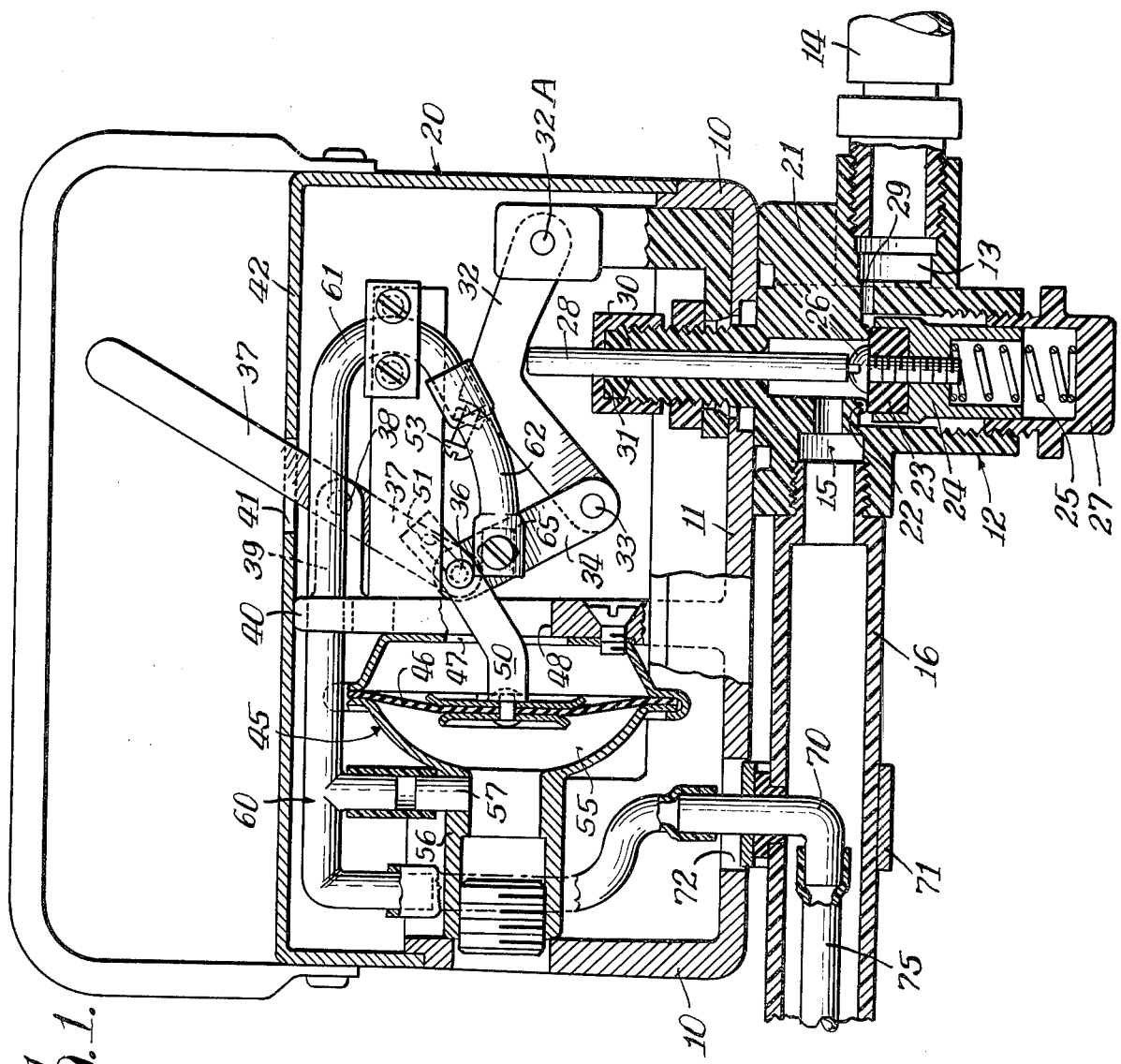
Fig. 1.
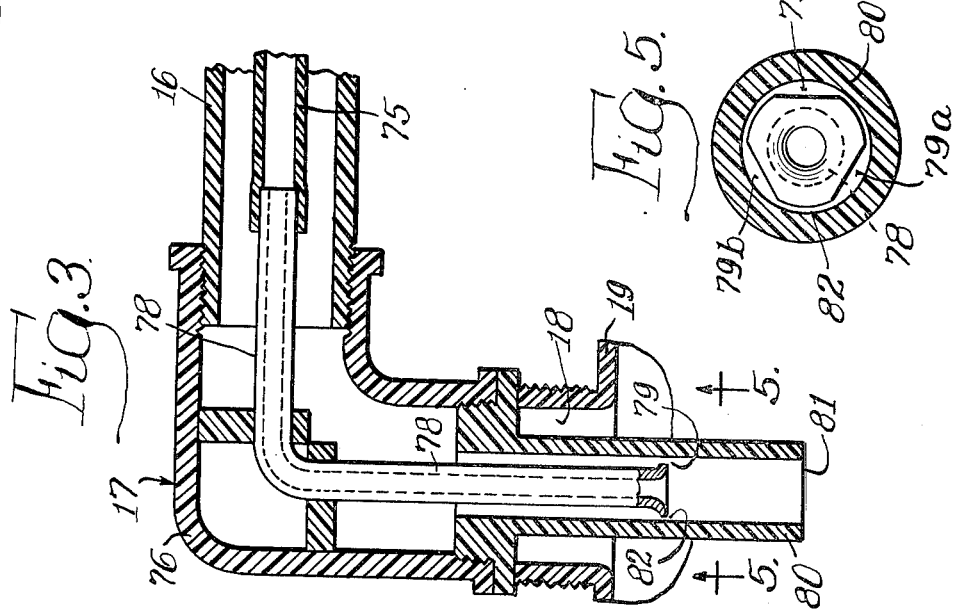
Fig. 3.
Fig. 5.

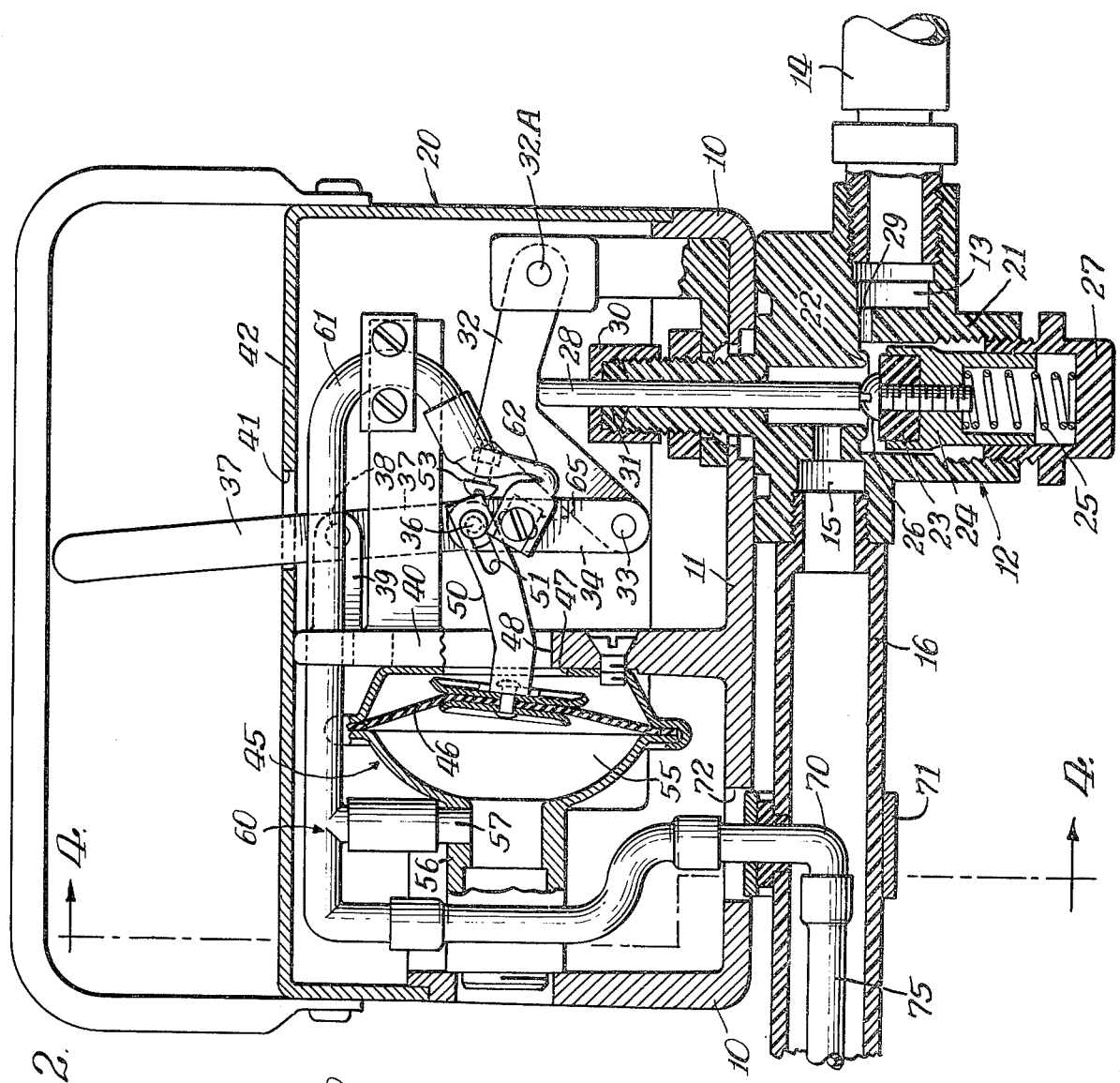
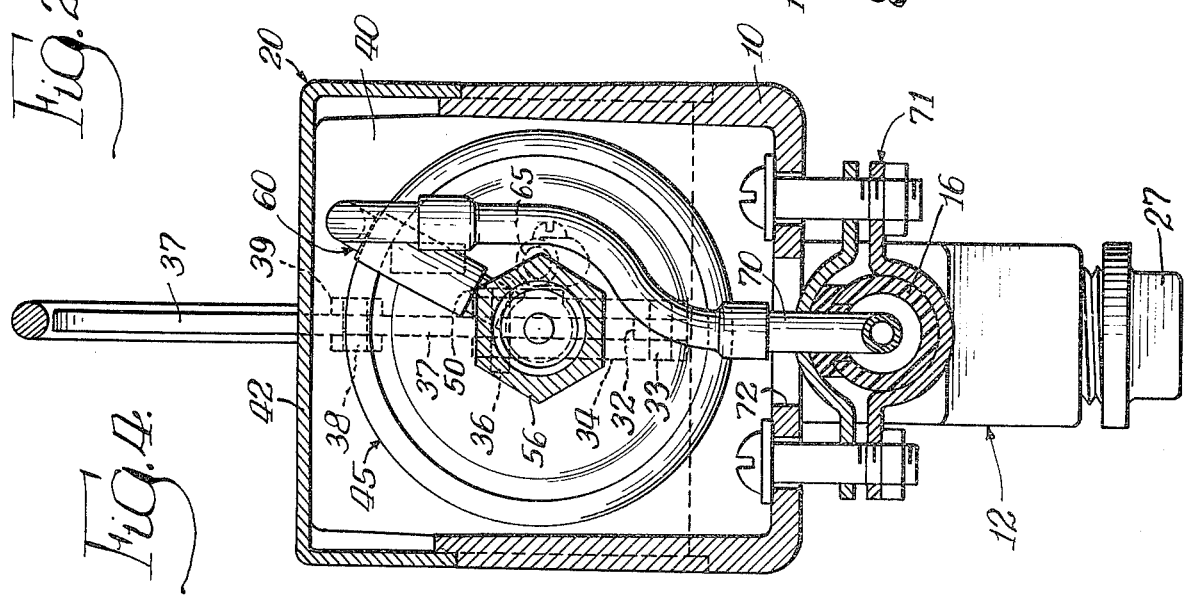

LIQUID SUPPLY DEVICE WITH AUTOMATIC FLOW CUT-OFF

This invention relates generally to an improved device for automatically filling a container with a liquid to a predetermined level, and more particularly to an improved electrostorage battery filling device having automatic liquid flow cut-off means operative when the liquid in the battery reaches a predetermined level.

One battery filling device having a liquid supply valve with automatic liquid flow cut-off means is disclosed in U.S. Pat. No. 2,822,831 issued to W. H. Williams, and the present invention is an improvement in the device shown in the above Williams patent.

In the battery filling device disclosed in the Williams patent the flow of liquid from a liquid supply line through a liquid supply valve, a filling pipe and filling nozzle produces a vacuum in a chamber containing a reciprocable diaphragm operatively connected with a liquid supply valve to effect automatically stopping of the flow of liquid to the battery cell when the liquid in the battery cell reaches a certain level relative to the lower end of the filling nozzle disposed within the battery.

In order to obtain a uniform liquid level and in order to avoid premature cut-off of the liquid supplied to the battery cells, it has been found necessary to limit the rate of liquid flow through the device. For example, in a device of the instant type wherein the discharge nozzle has an inside diameter of about 9/32 inches at the point where an air tube in the nozzle which connects with the vacuum chamber terminates in the lower end of the filling nozzle, the flow of liquid through the device should not exceed about 1 gallon per minute. Heretofore, a flow control fitting has been used between the liquid supply line and the valve which limits the flow of liquid to the valve. However, these assemblies are expensive and add significantly to the cost and increase the weight of the battery filling device.

It is therefore an object of the present invention to provide an improved filling device having automatic cut-off means which is more economical to manufacture and operates more reliably.

It is a further object of the present invention to provide an improved battery filling device which automatically limits the amount of liquid introduced into a battery cell and which has fewer parts and weights less than prior devices of its type.

Other objects of the invention will be apparent to one skilled in the art from the following detailed descriptions and claims when read in conjunction with the accompanying drawing wherein:

FIG. 1 is a vertical sectional view partially in elevation of one end of a device embodying the present invention with the valve in closed position;

FIG. 2 is a vertical sectional view of the device shown in FIG. 1 with the valve in open position;

FIG. 3 is a vertical sectional view of the other end of the device shown in FIG. 1;

FIG. 4 is a vertical sectional view partially in elevation taken along the line 4—4 of FIG. 2; and FIG. 5 is a bottom view partially in section taken along the line 5—5 of FIG. 3.

The battery filling device shown in the drawing and embodying a preferred form of the present invention comprises a lower housing section 10 which has fixed on the lower wall 11 thereof a spring-loaded lever-action valve assembly 12. The inlet chamber 13 is connected directly with an electro-storage battery liquid supply line 14. The outlet chamber 15 of the valve assembly 12 is connected with a liquid conduit or filling pipe 16 having a liquid delivery or filling nozzle 17 on the outer end thereof which is adapted to extend into the filling opening 18 of a battery cell 19. An upper housing section 20 has a handle affixed to the upper surface thereof. The upper housing section 20 is supported by the lower housing section 10.

The valve assembly 12 includes a valve housing 21, preferably molded of a durable plastic, having a valve seat 22 molded therein which is normally closed by resilient washer 23 seated in the upper end of a reciprocable valve head 24 normally urged upwardly into sealing contact with the valve seat 22 by a spring means 25. The resilient washer 23 is secured in a recess formed in the upper surface of a valve head 24 by fastener 26 mounted axially in the valve head 24. The spring means 25 is disposed between an end closure 27 mounted on the lower end of the valve housing and a cylindrical opening formed in the lower end of the valve head 24. A reduced diameter liquid inlet port 29 is formed in the wall of the housing section 21, and the port 29 is disposed opposite the valve seat 22.

A valve head push-rod 28 is mounted in the upper end of the valve housing 21 for reciprocable movement axially within the axial passage of the valve housing 21 with a cap member 30 and washer 31 forming a seal about the upper end thereof. A valve actuating means to be described hereinafter is adapted to move the valve head 24 and sealing washer 23 downwardly out of sealing engagement with the valve seat 22 against the upward pressure exerted by the spring 25 when liquid is to be supplied to the battery cell.

The valve control means comprising a fulcrum lever 32 adapted to engage the upper end of push-rod 28 has one end thereof pivotally anchored at 32A on a standard attached to the upper end of the valve housing 21 by a suitable fastener means. The outer end of lever 32 serves as the fulcrum at 33 for the lower bar 34 of a toggle joint. The upper end of bar 34 is pivotally connected by pin 36 to the lower end of the upper bar 37 of the toggle joint. The upper bar 37 is pivotally mounted at a fixed point 38 on a post 39 extending rearwardly from a perpendicular supporting wall 40 integral with lower wall 11 of the housing section 10. The upper bar 37 extends through an elongated passage 41 formed in the upper surface 42 of the upper housing section 20 and provides a manual valve control lever accessible from the outside of the housing.

A diaphragm casing 45 is secured to the perpendicular wall 40 on the side thereof opposite the toggle joint, and the casing 45 enclosed a flexible diaphragm 46. The side of the diaphragm 46 facing the toggle joint is exposed to the atmosphere by passage 47 formed in the rear wall of the casing 45 and a passage 48 formed in the support wall 40. The diaphragm 46 is connected with the toggle joint lower bar 34 by a connecting bar 50 fixed at one end to the diaphragm 46 and having the opposite end connected to the pivot pin 36 by means of an elongated slot 51 formed therein which accommodates the pin 36. The end of the connection bar 50 adjacent the slot 51 is adapted to abut an adjustable stop 53 mounted in the upper surface of the fulcrum lever 32 when the toggle joint is moved into locking position, thereby preventing movement of the toggle joint too far past dead center or locking position and avoiding damaging the diaphragm 46.

The closed side 55 of the diaphragm casing 45 has an axially extending cylindrical section 56 provided with a lateral passage 57 which is connected to a T-connector pipe 60, preferably formed of copper tubing. The rearwardly extending section 61 of the T-connector pipe 60 is disposed adjacent the upper wall 42 of the upper housing section and then extends downwardly and inwardly toward the toggle joint. The lower end of the pipe section 61 has a short length of flexible tubing 62 connected to a fitting 65 attached to the lower bar 34 between the ends thereof without sealably closing the end of the tubing 62 so that air can enter the tubing 62 when the toggle joint is in the unlocked position, as shown in FIG. 1 of the drawing.

The forwardly extending section 65 of the T-connector pipe 60 projects downwardly toward the lower wall 11 to form a sealable connection with a rigid elbow fitting 70, preferably formed of copper tubing, sealably held by a saddle clamp 71 which forms a sealable connection with the filling pipe 16. The upper end of the elbow fitting 70 extends through an opening in the lateral wall of pipe 16 and through a passage 72 formed in the lower wall 11 of the housing section 10. The lower end of the tube 70 is held axially within the filling pipe 16 and has an air tube 75, such as a length of plastic tubing, sealably connected therewith.

The air tube 75 extends through the filling pipe 16 and has the outer end thereof sealably connected with a rigid tubular elbow fitting 78, preferably formed of copper tubing, fixedly mounted axially within the filling nozzle 17. The filling nozzle 17 comprises an elbow section 76 with a cylindrical filling nozzle tip 80 mounted in the lower end thereof. The lower end portion of the elbow fitting 78 extends axially within the filling nozzle tip 80 to a point spaced upwardly from the lower end of the nozzle tip 80. A narrow passage 82 is formed by flaring outwardly the lower end of fitting 78 so as to reduce the clearance between the end of the tubular fitting 78 and the inner surface of the nozzle tip 80, thereby effecting liquid flow past the end of fitting 78 at an accelerated rate. And, as best shown in FIG. 5, three small, equally spaced flats 79, 79a, and 79b are preferably formed on the end of fitting 78 to permit streams of liquid to flow at a sufficiently fast rate into the end portion of the nozzle tip 80 and lower the atmospheric pressure within the end of nozzle 80 sufficiently to actuate the diaphragm-toggle latch valve closure means.

In operation, the filling device is connected with a source of a suitable liquid, such as water, via a liquid supply conduit 14, as indicated in FIG. 1; the cap of a battery cell 19 is removed; and the filling nozzle tip 80 is inserted into the cell 19, as shown in FIG. 3. The lever 37 is swung from the position shown in FIG. 1 to that shown in FIG. 2, causing the lever 32 to swing downwardly and move the push rod 28 downwardly so that the valve head 24 is moved downwardly against the pressure of spring 25 to open the valve and swing the toggle joint to the "past center" or locking position shown in FIG. 2. The pin 36, acting against the end of the slot 51, biases the diaphragm 46 from the position shown in FIG. 1 to that shown in FIG. 2. Water then flows through the valve, and is delivered through the annular space 82 in a stream passing through the nozzle tip 80 into the battery cell.

The stream of water passing the lower end of the rigid tubular fitting 78 which is connected to the air tube 75 entrains air in the tubular fitting 78 and tends to reduce the pressure in the air tube 75 and in chamber 55 below normal atmospheric pressure. This tendency is overcome, because the air space within the chamber 55 and the fitting 78 is in free and open communication with the atmosphere through the unobstructed open end 81 of the nozzle tip 80. As the water level rises in the battery cell 19 and approaches the lower end 81 of the nozzle tip 80, however, the free communication of the fitting 78 with the atmosphere is reduced and eventually cut off. The streams of water flowing through the narrow passage 82 now effects a reduction in pressure in the air tube 75 and chamber 55. When the reduction in pressure reaches a certain value, the atmospheric pressure on the right side of the diaphragm 46 (FIG. 2) forces the diaphragm to the left, moving the toggle joint and permitting the valve spring 25 to snap the liquid supply valve closed (FIG. 1).

If, before the lower end 81 of the filling tip 80 is closed by the liquid level in the cell rising to the desired level, the rate of flow of liquid through the narrow passage 82 is sufficiently rapid to create a vacuum in the diaphragm chamber 45 which draws the diaphragm to the left into the closed valve position shown in FIG. 1, the valve will prematurely cut off the flow of liquid to the cell. However, by providing a small diameter inlet port 29 through the wall of the valve housing 21 opposite the valve seat 22 with the port 29 having a diameter of about 120 thousandths of an inch and discharging liquid onto the valve seat, the required balance in the diaphragm chamber is obtained when the filling device shown herein is operated by connecting the device with a water supply system providing a line pressure of between about 20-40 pounds per inch; whereby liquid flows through the supply valve at a rate of about one gallon per minute.

The relation between the outside diameter of the flared lower end of the tubular fitting 78 and the inside diameter of the cylindrical nozzle tip 80 is also critical for a given dimensional structure in order to effect proper flow control, and in the herein illustrated form having the reduced diameter inlet port which has been found highly satisfactory in practice, the tubular fitting 78 has an outside diameter of 0.328 inches and is provided with three equally spaced flats, as shown in FIG. 5. The nozzle tip 80 has an inside diameter of 0.332 inches.

As an incident to activating the liquid supply valve by means of a vacuum being formed in the diaphragm chamber 45, water tends to build up in the rigid tubular fitting 78 and the air tube 75. Any build up or accumulation of water therein is prevented by having the closed side 55 of the diaphragm chamber automatically placed in communication with the outside atmosphere when the diaphragm 46 is actuated to close the valve, as a result of a vacuum being formed within the compartment 55. Thus, as the diaphragm 46 is moved to the left from the position shown in FIG. 2 into the position shown in FIG. 1, the section of flexible tubing 62 which has been bent or kinked while the valve was in open position so that no air could enter the end of the vent section 61 of the T-connector 60 is straightened as the diaphragm 46 pulls the connector bar 50; thereby permitting air to enter the vent section 61 and flow through the T-connector 60 and air tube 75 into the tubular fitting 78 so that water will drain therefrom.

Whereas the present invention has been specifically illustrated as an apparatus for filling battery cells, it should be understood that the apparatus could be used in the same form and size or modified in form or size or in any other obvious manner for supplying a liquid to other containers without departing from the present invention.

I claim:

1. In a filling device for delivering liquid to a predetermined level in a container including liquid level automatic flow cut-off means comprising a normally closed liquid supply valve having inlet and oulet ports, said inlet port having a restricted diameter which allows liquid to flow into said valve at a substantially reduced rate of flow from a liquid supply line, resilient means urging the valve into seating engagement with a valve seat, a liquid delivery nozzle in fluid-flow communication with said outlet port of said liquid supply valve, manually operable means for opening said valve, latch means for securing said valve in open position, a diaphragm operatively connected to said latch means for releasing the valve to cut off liquid flow to said delivery nozzle, a casing for said diaphragm open to the atmosphere at one side and having a normally closed diaphragm chamber at the other side of the diaphragm, an air tube axially disposed within the lower end portion of said delivery nozzle in liquid flow clearance with said nozzle, tubular means providing an air passage connecting said normally closed diaphragm chamber with said air tube, said delivery nozzle having at the lower end thereof a cylindrical filling tip which extends axially beyond the end of said air tube with said air tube having the lower end thereof disposed axially within said filling tip and being flared outwardly to form liquid flow passages of reduced clearance within said filling tip to effect entraining air from within said air tube, additional liquid flow passages of increased size being provided within said filling tip by a plurality of spaced flats on the peripheral surface of the outwardly flared lower end of said air tube, and the amount of clearance between the outwardly flared lower end of said air tube and said filling tip being coordinated with the size of said inlet port of restricted diameter whereby liquid flowing through said liquid flow passages actuates said latch means only when the lower end of the liquid delivery nozzle is closed by liquid within said container rising to said predetermined level.

2. A filling device as in claim 1, wherein said liquid supply valve is formed of a molded plastic housing having said inlet port of restricted diameter formed in a lateral wall thereof, and said inlet port adapted to introduce liquid into the interior of said valve housng adjacent said valve seat above the upper end of said valve.

* * * * *